(12) United States Patent
Sanson

(10) Patent No.: US 8,283,618 B2
(45) Date of Patent: Oct. 9, 2012

(54) METHOD AND DEVICE FOR READING ELECTRICAL CHARGES PRODUCED BY A PHOTO-DETECTOR, AND DETECTOR COMPRISING SUCH DEVICES

(75) Inventor: Eric Sanson, Grenoble (FR)

(73) Assignee: Societe Francaise de Detecteurs Infrarouges-Sofradir, Chatenay Malabry (FR)

( * ) Notice: Subject to any disclaimer, the term of this patent is extended or adjusted under 35 U.S.C. 154(b) by 496 days.

(21) Appl. No.: 12/568,050

(22) Filed: Sep. 28, 2009

(65) Prior Publication Data

US 2010/0090091 A1 Apr. 15, 2010

(30) Foreign Application Priority Data

Oct. 15, 2008 (FR) ...................................... 08.56994

(51) Int. Cl.
*H04N 5/335* (2011.01)
(52) U.S. Cl. ........................ 250/208.1; 348/297; 348/308
(58) Field of Classification Search ............... 250/208.1; 348/294, 297, 302, 308
See application file for complete search history.

(56) References Cited

U.S. PATENT DOCUMENTS

| 5,128,534 | A | * | 7/1992 | Wyles et al. | ................ | 250/208.1 |
| 5,898,332 | A | * | 4/1999 | Lefevre | ................ | 327/336 |
| 6,040,568 | A | * | 3/2000 | Caulfield et al. | ............ | 250/208.1 |
| 6,147,340 | A | * | 11/2000 | Levy | ................ | 250/214 R |
| 6,384,413 | B1 | * | 5/2002 | Pain | ................ | 250/330 |
| 6,653,636 | B2 | * | 11/2003 | Busse et al. | ................ | 250/370.09 |
| 6,822,213 | B2 | * | 11/2004 | Stark | ................ | 250/208.1 |
| 7,283,609 | B2 | * | 10/2007 | Possin et al. | ................ | 378/19 |
| 8,026,960 | B2 | * | 9/2011 | Hosier | ................ | 348/241 |
| 2002/0067415 | A1 | * | 6/2002 | Denyer et al. | ................ | 348/294 |
| 2003/0146389 | A1 | * | 8/2003 | Busse et al. | ................ | 250/370.09 |
| 2003/0201379 | A1 | * | 10/2003 | Stark | ................ | 250/208.1 |
| 2005/0110884 | A1 | * | 5/2005 | Altice et al. | ................ | 348/302 |
| 2006/0119718 | A1 | * | 6/2006 | Hur et al. | ................ | 348/302 |
| 2006/0170491 | A1 | * | 8/2006 | Wany et al. | ................ | 330/4.9 |
| 2007/0132867 | A1 | * | 6/2007 | Rhee et al. | ................ | 348/302 |
| 2007/0153109 | A1 | * | 7/2007 | Lule | ................ | 348/308 |
| 2008/0055441 | A1 | | 3/2008 | Altice | | |
| 2009/0256060 | A1 | * | 10/2009 | Meynants et al. | ........... | 250/208.1 |
| 2009/0268070 | A1 | * | 10/2009 | Hosier | ................ | 348/301 |
| 2010/0090091 | A1 | * | 4/2010 | Sanson | ................ | 250/206 |

OTHER PUBLICATIONS

O. Nesher, et al., "Performance of BF Focal Plane Array 320X256 InSb Detectors," Infrared Technology and Applications XXVIII, Proceedings of SPIE, vol. 4820 (2003), pp. 699-707.

* cited by examiner

*Primary Examiner* — John Lee
(74) *Attorney, Agent, or Firm* — Burr & Brown

(57) ABSTRACT

A method of reading electrical charges produced by a photo-detector of a photo-detector matrix includes collecting and storing electrical charges produced by the photo-detector in a first capacitive element, transferring the charges stored in the first capacitive element to a second capacitive element, and reading the voltage at the terminals of the second capacitive element. The transfer followed by the reading is carried out in at least two phases: at least one first phase taking place during the collection and storage of the charges in the first capacitive element, and a second phase taking place at the end of the collection and storage of the electrical charges in the first capacitive element.

9 Claims, 2 Drawing Sheets

METHOD AND DEVICE FOR READING ELECTRICAL CHARGES PRODUCED BY A PHOTO-DETECTOR, AND DETECTOR COMPRISING SUCH DEVICES

FIELD OF THE INVENTION

The invention relates to the field of the reading of electrical charges created in elementary detectors of a matrix detector, and particularly photodiodes.

BACKGROUND OF THE INVENTION

The use of elementary detectors, and particularly photodiodes, to detect electromagnetic radiation is known. Indeed, incident electromagnetic radiation on a photodiode in fact creates electrical charges therein. These charges are usually collected and accumulated in an integrating capacitance so that they can subsequently be read. This device is improved by allowing the integration and read phases to overlap in time. To this end, a reading capacitance and a transfer switch are usually used.

FIG. 1 shows schematically, under the general reference 10, a prior art device of this kind for reading the electrical charges produced in a photodiode 12 belonging to a matrix of photodiodes in a detector of electromagnetic radiation, such as infrared radiation, visible radiation or ultra-violet radiation for example. This device allows the charges to be integrated and read simultaneously.

Said read device 10, associated with each photodiode 12 of the detector, comprises:
- a first so-called "integrating" capacitor 14;
- a second so-called "read" capacitor 16;
- an injection circuit 18 the function of which, when it is enabled, is to bias the photodiode 12 and to transfer the electrical charges produced by it to the integrating capacitor 14. Another function of the injection circuit 18 is to discharge the integrating capacitor 14;
- a switch 20 the function of which, when it is in its closed state, is to transfer the electrical charges stored in the integrating capacitor 14 to the read capacitor 16;
- a read circuit 22 the function of which is to read the voltage at the terminals of the read capacitor 16 and to transmit by multiplexing the voltage measurement to the outside of the read device 10, for example on a column bus of the detector, the photodiode matrix being read by scanning, as is known per se. Another function of the read circuit 22 is to discharge the read capacitor 16; and
- a control circuit 24 controlling the injection circuit 18, the switch 20 and the read circuit 22. The control circuit 24 usually also controls the other read circuits associated with the detector photodiodes, in order to synchronize all the control signals, as is known per se.

More particularly, the control circuit 24 controls:
- by means of a signal "INJ", the enabling and disabling of the bias of the photodiode 12 and of the transfer of the charges produced thereby, implemented by the injection circuit 18;
- by means of a binary signal "RINT", the discharge of the integrating capacitor 14, implemented by the injection circuit 18;
- by means of a binary signal "TFX", the status of the switch 20 for transferring the charges from the integrating capacitor 14 to the read capacitor 16;
- by means of a binary signal "RLECT", the discharge of the read capacitor 16, implemented by the read circuit 22; and
- by means of a binary signal "LECT", the reading of the voltage at the terminals of the read capacitor 16 and the transmission of the read voltage to the outside of the device 10, implemented by the read circuit 22.

In FIG. 2, control signal timing diagrams for the control circuit 24 show a method for reading the electrical charges produced by the photodiode 12 as implemented by the read device 10 according to the prior art.

At 30, the signal "INJ" is switched into its high state. The charges produced in the photodiode 12 under the effect of an incident radiation are then stored, via the injection circuit 18, in the integrating capacitor 14, the latter being previously reset by the signal "RINT". After a predetermined period Tint, the signal "INJ" is switched, at 32, into its low state, the storage of the charges produced by the photodiode 12 in the integrating capacitor 14 then being stopped.

Once the storage of the charges in the integrating capacitor 14 has stopped ("INJ" in its low state), the signal "TFX" is switched, at 34, into its high state in order to transfer, via the switch 20, the charges stored in the integrating capacitor 14 to the read capacitor 16, the latter being previously reset by the signal "RLEC". Once this, almost instantaneous, transfer is completed, the signal "TFX" is switched, at 36, into its low state. The read signal "LECT" is then switched, at 38, into its high state in order to read the voltage at the terminals of the read capacitor 16 and to transfer the read voltage to the outside of the device 10.

The integrating 14 and read 16 capacitors are then discharged by switching the signals "RINT" and "RLEC" into their high state at 40 after the end of integration and 42 after the end of reading respectively. A new integration and read cycle can then start after a new switching of the signal "RINT" at 44 and the signal "RLEC" at 43 respectively.

It will be noted that the reading implemented by the read circuit 22 comes to an end while the storage of the charges in the integrating capacitor is effective (signal "INJ" in its high state) and the transfer of the charges between the integrating and read capacitors 14, 16 is disabled (signal "TFX" in its low state). Indeed, as is known per se, the voltage read by the read circuit 22 is delivered in multiplexed mode on a column bus of the detector, the matrix of photodiodes of the detector being read line by line. In fact, reading and delivering a voltage in a matrix read by scanning takes some time. In order not to suspend over this period of time the storage of the charges in the integrating capacitor 14 on account of a direct reading of the voltage at the terminals thereof, the read capacitor 16 is provided. Transferring the charges produced by the photodiode 12 into the read capacitor 16 thus allows the voltage to be read at the terminals thereof, while a new cycle of accumulating the charges produced by the photodiode 12 in the integrating capacitor 14 has started.

A first limitation on the operation of the read device so described stems from the limited size of the integrating capacitor 14. Indeed, the surface usually allocated to the read device 10 is limited for reasons of compactness. The total electrical charge that can be stored in the read capacitor 14, which depends on the latter's size, is therefore limited. The detector dynamic is thus also limited. By way of example of said limited dynamic, the integrating capacitors associated with the photodiode matrix thereof rapidly saturate under the effect of intense radiation.

A second limitation relates to the read noise. Indeed, below a certain charge stored in the read capacitor 16, a charge which is dependent on the value of the capacitance thereof, voltage reading at the terminals of the read capacitor 16 is marred by a significant noise relative to the voltage read.

The read device, in its conventional operation, therefore sees its dynamic limited, both in the high charges (limited total storable charge) and in the low charges (low charge reading with added noise effects).

To overcome these drawbacks, a proposal has been made in the document "*Performance of BF focal plane array 320×256 InSb detector*" by O. Nesher, Semi Conductor Devices, proc. of SPIE, vol. 4820, page 699, for a double integration of the charges produced by the photodiode 12.

According to this technique, shown in FIG. 3, two integrations of different durations are performed concomitantly, an injection phase "A" with an integration time Tinta, shorter than the integration time Tint precedes an injection phase "B1" with the integration time Tint1. An injection phase "B2", with an injection time Tint2, may precede the injection phase "A" in order to improve the temporal coherence, the read value "B" then corresponding to the total amount of the charges built up during Tint1 and Tint2.

An increased dynamic is thus obtained, since the total "storable" charge is multiplied virtually by the coefficient $$\frac{Tint1 + Tint2}{Tinta}.$$

In addition, two voltage measurements are obtained, the first corresponding to a short period of integrating the charge in the integrating capacitor 14, and the second corresponding to a long period of integrating in the capacitor 14. The first measurement thus comprises information about the highest part of the signal dynamic and the second measurement comprises information about the lowest part of the signal. The two measurements can be combined to obtain a large dynamic measurement.

Temporal coherence is simulated by framing the injection phase "A" with the two injection phases "B1" and "B2". It will be noted that this technique operates satisfactorily for gradually changing incident fluxes. However, a pulsed incident flux may not be acquired simultaneously by the phases "A" and "B1+B2". For an incident flux of this kind, temporal coherence is not obtained.

Furthermore, the choice of a smaller capacity capacitor for phases "B1" and "B2" is made possible as an addition to phase "A", which means that the overall noise level of the signal obtained can be reduced. However, successive samplings of phases "B1" and "B2" help to increase reader noise.

In addition, as is pointed out in the aforementioned document, a specific read device is used. To fulfill all the functionalities listed in this document, said device is likely to comprise an additional capacitor, which is disadvantageous in so far as the read device is usually integrated into a small surface, for example into a small pitch matrix detector.

SUMMARY OF THE INVENTION

The purpose of the present invention is to propose a method and a device for reading the charges produced by a photo-detector of a matrix detector that allows the dynamic thereof to be increased without degrading the read noise.

To this end, the object of the invention is a method for reading electrical charges produced by a photo-detector of a photo-detector matrix, comprising collecting and storing electrical charges produced by the photo-detector in a first capacitive element, transferring the charges stored in the first capacitive element to a second capacitive element and reading the voltage at the terminals of the second capacitive element.

According to the invention, the transfer followed by the reading is carried out in at least two phases, at least one first phase taking place during the collection and storage of the charges in the first capacitive element, and a second phase taking place at the end of the collection and storage of the electrical charges in the first capacitive element.

In other words, the invention is based on the fact that the reading of the voltage at the terminals of the second capacitive element is not destructive, the quantity of charges stored in this element prior to reading being substantially equal to the quantity of charges stored after the reading. It is thus possible to transfer, while actually in the process of storing in the first capacitive element, the charges already stored therein and to read the corresponding voltage. Once the integration time is completed, the charges accumulated in the first capacitive element since this transfer are also transferred to the second capacitive element and are added to the charges already stored. In fact, the total charge at the end of integration is substantially equal to that obtained at the end of the prior art integration time but, under the invention, at least one additional intermediate voltage measurement is provided.

This intermediate measurement obtained with a shorter integration time covers a dynamic located above the prior art dynamic. It thus complements the prior art dynamic and the overall dynamic of the detector is thus extended.

Moreover, the high-level dynamic of the detector is deduced from the measurement of the first phase and the low level dynamic is deduced from the measurement of the second phase.

Furthermore, the measurement noise is not increased by the intermediate measurements since the readings are not destructive. The noise of each read sampling is thus cancelled after each reading by a rebalancing of the charges at the next phase.

According to one advantageous inventive feature, the or each transfer phase occurring during the collection and storage of the charges in the first capacitive element is conducted simultaneously for all the photo-detectors in the photo-detector matrix.

In addition, and to advantage, the second capacitive element is discharged solely after the second transfer phase.

Another object of the invention is a read device for electrical charges produced by a photo-detector in a photo-detector matrix, said device comprising:
  a first and second capacitive elements,
  an injection circuit, capable, when it is enabled, of biasing the photo-detector and transferring the charges produced thereby to the first capacitive element,
  a controllable switch, capable, in its closed state, of transferring the charges stored in the first capacitive element to the second capacitive element,
  a read circuit capable of reading the voltage at the terminals of the second capacitive element,
  and a control circuit capable of controlling the switch in order to transfer the charges from the first capacitive element to the second capacitive element.

According to the invention, the control circuit is capable of closing the switch, and then controlling the reading of the charges stored in the second capacitive element during at least two phases, at least one first phase taking place while the injection circuit is enabled, and a second phase taking place at the end of integration, before or after the injection circuit is disabled.

In other words, the device implements the method of the aforementioned type.

To advantage, the control circuit is capable of closing the switches associated respectively with the photo-detectors in a synchronized way.

In addition, and according to another advantageous feature, the control circuit is capable of discharging the second capacitive element when the read circuit is disabled.

Another purpose of the invention is an electromagnetic radiation detector, comprising a plurality of photo-detectors capable of creating electrical charges or modulating an electric current under the effect of an incident electromagnetic radiation, the detector comprising, associated with each of the photo-detectors, a device of the aforementioned type for reading the charges produced by the photo-detector.

BRIEF DESCRIPTION OF THE FIGURES

The invention will be better understood from reading the following description, given solely by way of example, and made in relation to the appended drawings, wherein identical reference numbers denote identical or similar elements, and wherein.

DETAILED DESCRIPTION OF THE INVENTION

Figure 1:
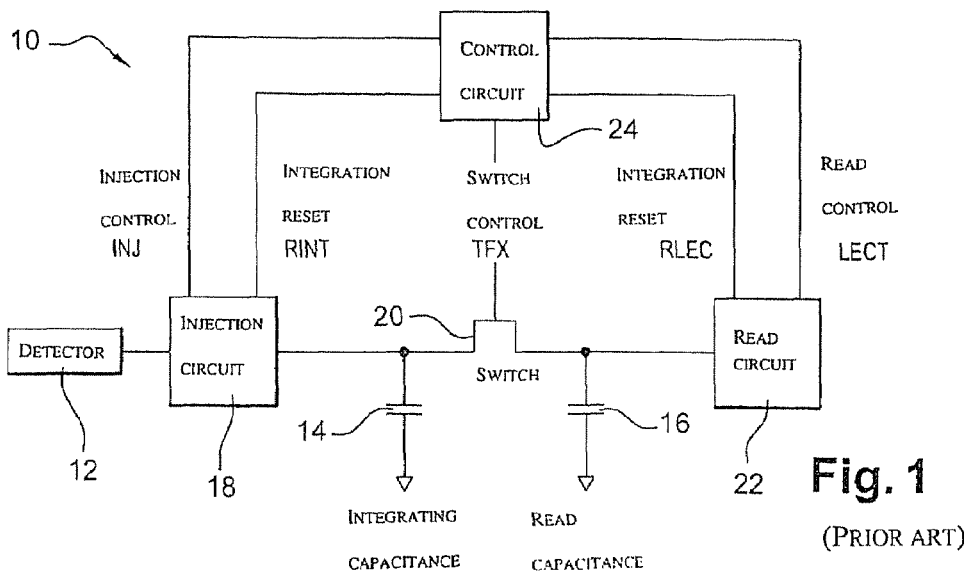
FIG. 1 is a schematic view of a prior art read device, already described above.
Figure 4:
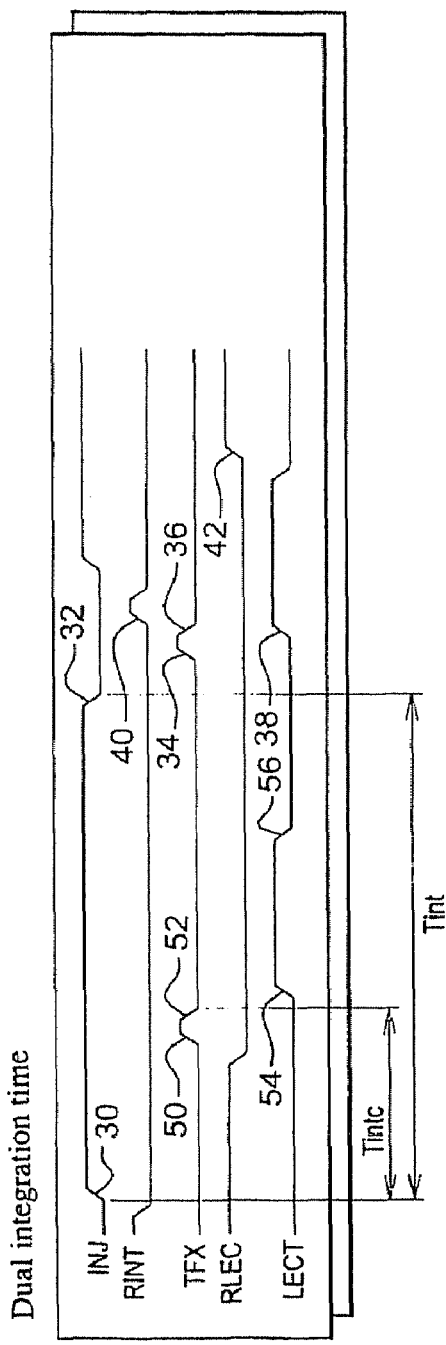
FIG. 4 is a timing diagram layout of control signals in a control circuit of the device in FIG. 1 showing a first inventive reading method.

In FIG. 4, timing diagrams of control signals in the control circuit 24 show an inventive method of reading the electrical charges produced by the photodiode 12 employed by the read device 10 described in relation to FIG. 1.

Figure 2:
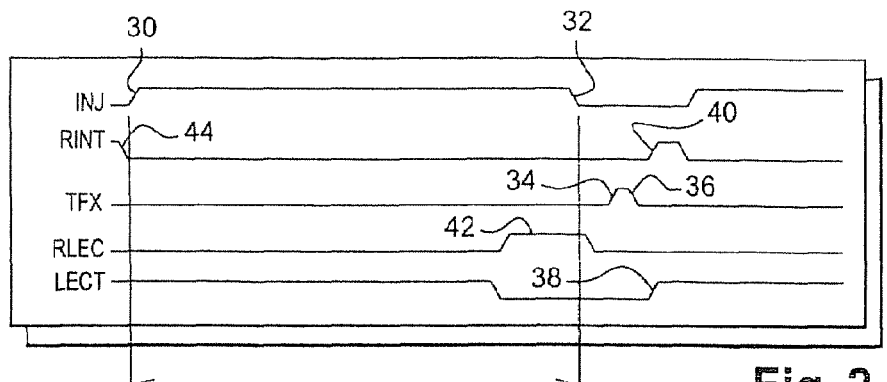
FIG. 2 is a timing diagram layout of control signals in a control circuit of the device in FIG. 1 showing a first prior art reading method, also already described above.
Figure 3:
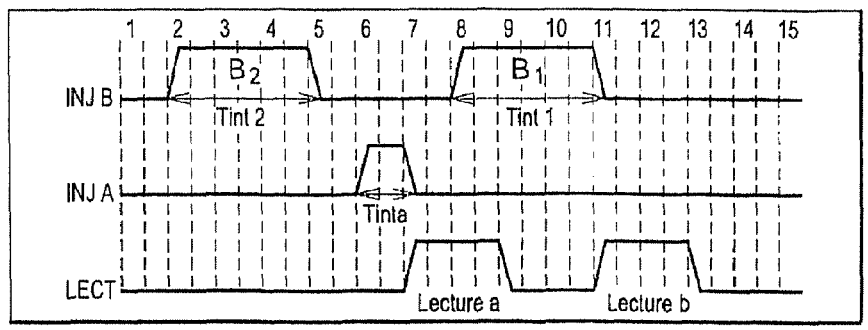
FIG. 3 is a simplified timing diagram layout of control signals in a control circuit of the device in FIG. 1, proposed as an example in order to conduct a dual integration, showing a second prior art reading method, already described above.

This method mainly differs from the one described in relation to FIG. 2 in that the signal "TFX" is in addition switched, at 50, into its high state during the integration time Tint. The charges already stored in the integrating capacitor 14 are then transferred, via the switch 20, to the read capacitor 16. Once this almost instantaneous transfer is completed, the signal "TFX" is switched, at 52, into its low state. The read signal "LECT" is then switched, at 54, into its high state in order to read the voltage at the terminals of the read capacitor 16, and to transfer the read voltage to the outside of the device 10, and then switched, at 56, into its low state before the signal "INJ" is switched into its low state at 32.

Once the signal "INJ" is switched at 32 into its low state, the sequencing of the signals is then described in relation to FIG. 2.

Thus, part of the charges produced by the photodiode 12, accumulated in the integrating capacitor 14 over a predetermined time Tintc, is transferred to the read capacitor 16 in order to be read without the latter being discharged however before the next reading. At the end of the integration phase, all the charges produced by the photodiode 12 over the integration time Tint are thus divided between the capacitors 14 and 16, and are then finally stored in the read capacitor 16 at the end of the transfer 36 for reading. In fact, an additional measurement is taken, said measurement being temporally coherent with the measurement taken at the end of the integration time Tint. In addition, the positioning of the transfer of charges between the capacitors 14, 16 within the integration time Tint allows more significant flows to be measured without exceeding the limits of the storable charges of the read circuit. The dynamic is thus extended.

In addition, the control circuit 24 synchronizes all transfers and voltage readings carried out during the integration time Tint for photodiodes of the detector. Two temporally coherent images of the scene are thus obtained which nonetheless present different contrasts. In particular more details are obtained in low lighting and in strong lighting.

The temporal coherence is defined by the fact that there is a time interval during which the charges produced by the photodiode 12 are found in all the images obtained.

Figure 5:
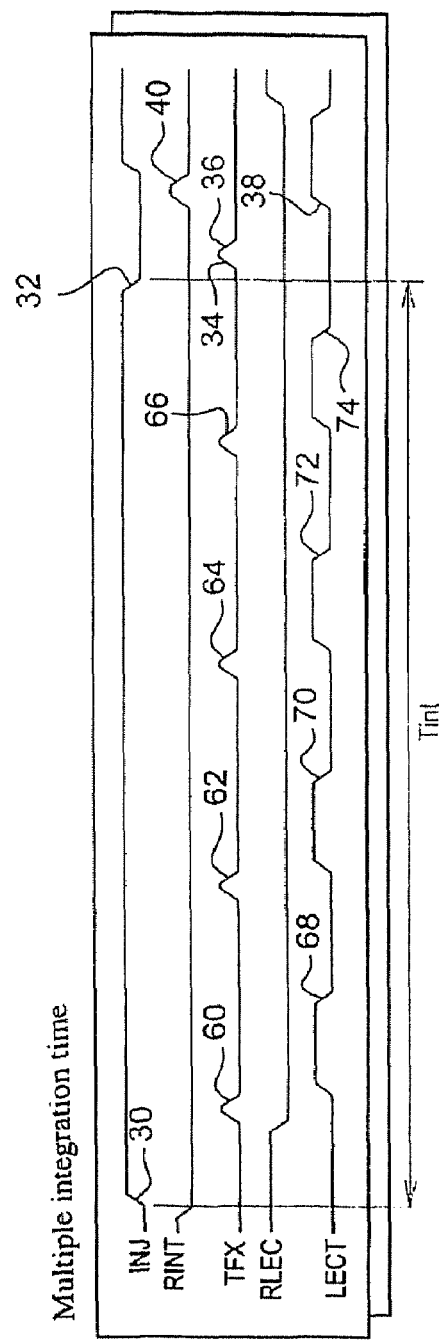
FIG. 5 is a timing diagram layout of control signals in a control circuit of the device in FIG. 1 showing a second inventive reading method.

Although a description has been given of only one transfer and only one reading of the charges produced by the photodiode during the integration time Tint, a plurality of measurements are possible, as is shown in FIG. 5, wherein a plurality of transfers 60-64 followed by respective readings 68-74 of the voltage at the terminals of the read capacitor 16 are conducted during the integration time Tint.

Preferably, the capacitance of the read capacitor 16 is substantially less than the capacitance of the integrating capacitor 14 in order to maximize the size of the integrating capacitor which defines the maximum number of charge that can be stored in the read circuit. By way of example, the capacitance of the read capacitor 16 is less than one third the capacitance of the integrating capacitor 14.

By means of the invention, the following advantages are thus obtained:
  temporally coherent measurements of a single scene;
  different contrasts of the same scene;
  an increase in the detector dynamic;
  a reduction in read noise; and
  a straightforward implementation, since only the control circuit logic is modified in order to implement the invention.

The invention claimed is:

1. A method for reading electrical charges produced by a photo-detector of a photo-detector matrix by integrating said charges during an integration period, thereby producing an output voltage, and reading the output voltage, said method comprising:
  collecting and storing said charges in a first capacitive element during the integration period;
  transferring the charges stored in the first capacitive element during the integration period to a second capacitive element; and
  reading the output voltage at the terminals of the second capacitive element,
wherein the transfer of the charges stored in the first capacitive element during the integration period is carried out in at least two phases:
  at least one first phase taking place during the collection and storage of the charges in the first capacitive element; and
  a second phase taking place at the end of the collection and storage of the electrical charges in the first capacitive element, and
wherein said step of reading the voltage at the terminals of the second capacitive element results from each transfer of the charges during the integration period, thereby providing for the integration period at least one intermediate voltage in addition to the output voltage.

2. The method for reading electrical charges as claimed in claim 1, wherein each transfer phase occurring during the collection and storage of the charges in the first capacitive element is conducted simultaneously for all the photo-detectors in the photo-detector matrix.

3. The method for reading electrical charges as claimed in claim 1, wherein the second capacitive element is discharged only after the second transfer phase.

4. A device for reading electrical charges produced by a photo-detector of a photo-detector matrix by integrating said charges during an integration period, thereby producing an output voltage, and reading the output voltage, said device comprising:

a first and a second capacitive elements;

an injection circuit capable, when it is enabled, of biasing the photo-detector and capable of transferring the charges produced thereby to the first capacitive element;

a controllable switch, capable in its closed state, of transferring the charges stored in the first capacitive element to the second capacitive element;

a read circuit capable of reading the voltage at the terminals of the second capacitive element; and and a control circuit capable of controlling the switch in order to transfer the charges from the first capacitive element to the second capacitive element, wherein the control circuit is capable of closing the switch, and then controlling the reading of the charges stored in the second capacitive element during the course of at least two phases of the integration period, at least one first phase taking place while the injection circuit is enabled, and a second phase taking place at the end of integration, before or after the injection circuit is disabled, and wherein the read circuit reads the voltage at the terminals of the second capacitive element resulting from each transfer of the charges during the integration period, thereby providing for the integration period at least one intermediate voltage in addition to the output voltage.

5. The device for reading electrical charges as claimed in claim 4, wherein the control circuit is capable of closing the switches respectively associated with the photo-detectors in a synchronized way.

6. The device for reading electrical charges as claimed in claim 4, wherein the control circuit is further capable of discharging the second capacitive element when the read circuit is disabled.

7. A detector of electromagnetic radiation comprising a plurality of photo-detectors capable of creating electrical charges or modulating a current under the effect of an incident electromagnetic radiation, the detector comprising, associated with each of the photo-detectors, a device as claimed in claim 4 for reading charges produced by the photo-detector.

8. A detector of electromagnetic radiation comprising a plurality of photo-detectors capable of creating electrical charges or modulating a current under the effect of an incident electromagnetic radiation, the detector comprising, associated with each of the photo-detectors, a device as claimed in claim 5 for reading charges produced by the photo-detector.

9. A detector of electromagnetic radiation comprising a plurality of photo-detectors capable of creating electrical charges or modulating a current under the effect of an incident electromagnetic radiation, the detector comprising, associated with each of the photo-detectors, a device as claimed in claim 6 for reading charges produced by the photo-detector.

* * * * *